United States Patent [19]
Chen et al.

[11] Patent Number: 6,045,728
[45] Date of Patent: Apr. 4, 2000

[54] METHOD OF TREATING A ZINC SULFIDE BODY FORMED BY CHEMICAL VAPOR DEPOSITION TO INCREASE ITS RAIN EROSION DURABILITY

[75] Inventors: William W. Chen, Los Angeles; Norman H. Harris, Newhall; Stephen A. Gabelich, San Pedro, all of Calif.

[73] Assignee: Raytheon Company, Lexington, Mass.

[21] Appl. No.: 09/169,311

[22] Filed: Oct. 9, 1998

[51] Int. Cl.⁷ .................................................. B29D 11/00
[52] U.S. Cl. .......................... 264/1.21; 264/340; 264/346
[58] Field of Search ................... 264/1.21, 340, 264/346

[56] References Cited

U.S. PATENT DOCUMENTS

| | | | |
|---|---|---|---|
| 3,670,220 | 6/1972 | Kun | 317/237 |
| 4,944,900 | 7/1990 | Willingham et al. | . |
| 5,126,081 | 6/1992 | Willingham et al. | . |
| 5,575,959 | 11/1996 | Harris et al. | . |
| 5,643,505 | 7/1997 | Harris et al. | . |

OTHER PUBLICATIONS

Boyer, Howard E., Gall, Timothy L., "Metals Handbook", American Society For Metals,, 1985.

Cleartran, "Morton Advanced Materials", http://www.mortonvd.com/cleartra.htm, 1998.

Chen, William W. et al., "Experimental and Theoretical Studies of Second–phase Scattering in IR Transmitting ZnS–based Windows", Department of Materials Science and Engineering. No Date.

Savage, J.A., "Infrared Optical Materials and Their Antireflection Coatings", Adam Higler, 1985.

*Primary Examiner*—James Derrington
*Attorney, Agent, or Firm*—Colin M. Raufer; Leonard A. Alkov; Glenn H. Lenzen, Jr.

[57] ABSTRACT

An erosion-resistant, chemically vapor-deposited zinc sulfide window and method of making the same are disclosed. The method includes the step of immersing a chemically vapor-deposited or a hot isostatic pressed, chemically vapor-deposited zinc sulfide body into a liquid comprising gallium, the liquid having a temperature of about 600° C. to about 1000° C., for at least about thirty minutes to form a gallium-doped body. The gallium-doped, chemically vapor-deposited zinc sulfide body according to the invention is one capable of transmitting light having a wavelength in the range of about 300 nanometers to about 15,000 nanometers. Furthermore, the gallium-doped, chemically vapor-deposited zinc sulfide window according to the invention is capable of transmitting light, having a wavelength in the range of about 380 nanometers to about 700 nanometers have been exposed to rain erosion for 20 minutes at 470 miles per hour with a 90° incidence angle, with at least about 150% more efficiency than a non-doped, chemically vapor-deposited zinc sulfide window.

10 Claims, 5 Drawing Sheets

METHOD OF TREATING A ZINC SULFIDE BODY FORMED BY CHEMICAL VAPOR DEPOSITION TO INCREASE ITS RAIN EROSION DURABILITY

BACKGROUND OF THE INVENTION

1. Field of the Invention

The invention relates to improving the physical characteristics, such as the strength, the hardness, and the rain erosion durability, of chemically vapor-deposited zinc sulfide windows and hot isostatic pressed, chemically vapor-deposited zinc sulfide windows without compromising the optical transmission characteristics of such windows.

2. Brief Description of the Related Art

A chemically vapor-deposited zinc sulfide (hereafter "CVD ZnS") structure may be made by a variety of methods known in the art. One such method, for example, includes reacting gaseous zinc vapor (from molten zinc) and a gaseous hydrogen sulfide within a closed, growth chamber for a period sufficient to form a film of zinc sulfide on a mold within the chamber. The reaction period may be adjusted to achieve a zinc sulfide film of desired thickness. By cooling the film, a CVD ZnS structure is formed, the structure having a shape defined by the mold. The CVD ZnS structure is then removed from the chamber, machined to a desired size, ground, and polished to form a CVD ZnS window. See generally, J. A. Savage, *Infrared Optical Materials and Their Antireflection Coatings*, Adam Hilger LTD., Bristol and Boston (1985), pgs. 100–103. Optionally, the CVD ZnS window may be hot isostatic pressed (HIP) to improve the optical transmission characteristics of the window. Generally, CVD ZnS materials modified by a post-deposition hot isostatic press are commercially available, for example, under the tradename CLEARTRAN® from Morton International, Chicago, Ill.

Hot isostatic pressed CVD ZnS windows such as those made as CLEARTRAN® material are known for exhibiting excellent broadband transmission characteristics and have been used as window materials for optical and infrared applications. Hot isostatic pressed CVD ZnS windows, however, are soft and readily sustain damage causing loss in optical transmission when exposed to rain at high velocity. Such poor rain erosion durability limits the use of CLEARTRAN® material as a window in high velocity applications, such as in military aircraft.

Strength-enhancing coatings have been applied to increase the strength, the hardness, and the rain erosion durability of the formed hot isostatic pressed CVD ZnS windows. Unfortunately, however, application of such coatings to these windows has a detrimental effect on the optical transmission characteristics of the windows. For example, use of boron phosphide (BP), gallium phosphide (GaP), or gallium aluminum phosphide (GaAIP) coatings, while improving the strength, hardness, and rain erosion durability of hot isostatic pressed CVD ZnS windows, causes a degradation of transmission in the visible spectrum of light (e.g., about 380 nanometers to about 700 nanometers). Due to the detrimental effect such conventional, post-fabrication coatings have on hot isostatic pressed CVD ZnS windows, use of hot isostatic pressed CVD ZnS windows treated with such coatings may be limited to black and white video applications.

Another type of zinc sulfide window is made by powder processing techniques, as opposed to chemical vapor deposition techniques. Methods of increasing the strength of powder-processed zinc sulfide windows have included the preparation of a $ZnS$—$Ga_2S_3$ solid solution by the in situ addition of gallium sulfide in a bulk zinc sulfide material. J. Zhang et al., Solid-State Phase Equilibria in the ZnS—Ga$_2$S$_3$ System, J.AM. CERAMIC SOC'Y. Vol 73, No. [6], pgs. 1544–47 (1990). It has been shown that at certain temperatures, the gallium precipitates out of the ZnS—Ga$_2$S$_3$ solution as a zinc thiogallate ($ZnGa_2S_4$). W. W. Chen et al., Experimental and Theoretical Studies of Second-Phase Scattering in IR Transmitting ZnS-Based Windows, Proceedings of SPIE, San Diego (1991).

Another method of improving the strength of powder processed zinc sulfide windows includes a powder densification method disclosed in Harris et al., U.S. Pat. No. 5,575,959 and in Harris et al. U.S. Pat. No. 5,643,505. These patents teach the addition of gallium for hardening zinc sulfide by co-precipitation of the gallium as an integral part of the zinc sulfide crystal lattice which forms an intimate mixture of zinc sulfide and gallium sulfide ($ZnS$—$Ga_2S_3$). The $ZnS$—$Ga_2S_3$ solid solution can then be mixed with pure zinc sulfide as a bulk component, a surface-enrichment component, or as a gradient of concentrations. The resulting zinc thiogallate ($ZnGa_2S_4$) precipitate has the effect of hardening and strengthening the zinc sulfide window. A subsequent processing step includes hot isostatic pressing.

In an alternative method disclosed in the aforementioned patents, gallium metal is evaporated onto the surface of a powder processed zinc sulfide body, which is formed by co-precipitation of the sulfide and zinc salt, and subsequent hot pressing and hot isostatic pressing of the co-precipitate. Once the gallium metal has been evaporated onto the surface of the zinc sulfide body, the body is annealed to diffuse the gallium metal into the zinc sulfide body and, following subsequent suitable annealing, a surface zinc thiogallate phase ($ZnGa_2S_4$) is formed.

To the extent that the methods disclosed in the prior art (e.g., the above-identified Harris et al. patents) have resulted in measurable improvements in infrared transmission and hardness, such methods are limited to powder processing and do not teach how to harden CVD ZnS materials or hot isostatic pressed CVD ZnS materials. For example, attempts to evaporate gallium metal into the surface of CVD ZnS and the subsequent annealing thereof to effect diffusion of the gallium metal have proven difficult, and often inadequate. Furthermore, the prior art is silent as to how to improve the strength, the hardness, and the rain erosion durability of commercially-available CVD ZnS windows or hot isostatic pressed CVD ZnS windows without compromising the desirable optical transmission characteristics of the windows. Accordingly, it would be desirable to provide a method of improving the rain erosion durability of CVD ZnS windows and hot isostatic pressed CVD ZnS windows, without detrimentally influencing the optical transmission characteristics of the windows.

SUMMARY OF THE INVENTION

It is an object of the invention to overcome one or more of the problems described above.

According to the invention, a body of zinc sulfide formed by chemical vapor deposition is treated to increase the strength, the hardness, and the rain erosion durability of the body by a method including the step of immersing the body in a liquid comprising gallium, the liquid having a temperature of about 600° C. to about 1000° C., for a time period of at least about thirty minutes. The invention provides a treated, optically-transmissive zinc sulfide body capable of transmitting light having a wavelength of about 300 nanometers to about 15,000 nanometers. The body includes a chemically vapor-deposited body of zinc sulfide doped with gallium metal ions that are diffused into the zinc sulfide body.

Other objects and advantages of the invention may become apparent to those skilled in the art from a review of the following detailed description, taken in conjunction with the drawings, the examples, and the appended claims.

DETAILED DESCRIPTION OF THE INVENTION

The invention is directed to a treated, optically-transmissive zinc sulfide body capable of transmitting light having a wavelength of about 300 nanometers to about 15,000 nanometers. The body includes a chemically vapor-deposited ("CVD") or hot isostatic pressed ("HIP") CVD body of zinc sulfide doped with gallium metal ions that are diffused into the zinc sulfide body. The invention also is directed to a method of treating a body of zinc sulfide formed by chemical vapor deposition to increase the rain erosion durability of the body. The method includes the step of immersing the body in a liquid comprising gallium, the liquid having a temperature of about 600° C. to about 1000° C., for a time period of at least about one hour.

An embodiment of the inventive method includes placing a CVD ZnS or hot isostatic pressed CVD ZnS body in a container, such as a quartz tube, containing a liquid comprising gallium. Preferably the container is evacuated, sealed, and placed in a resistance-heated box furnace. The container is heated to provide a liquid gallium temperature of about 600° C. to about 1000° C. for at least about 30 minutes. During this heating process, gallium ions diffuse into the CVD ZnS or hot isostatic pressed CVD ZnS body. The gallium-doped CVD ZnS or hot isostatic pressed CVD ZnS body is then polished to a desired finish to form a treated CVD ZnS window or hot isostatic pressed CVD ZnS window.

Figure 1:
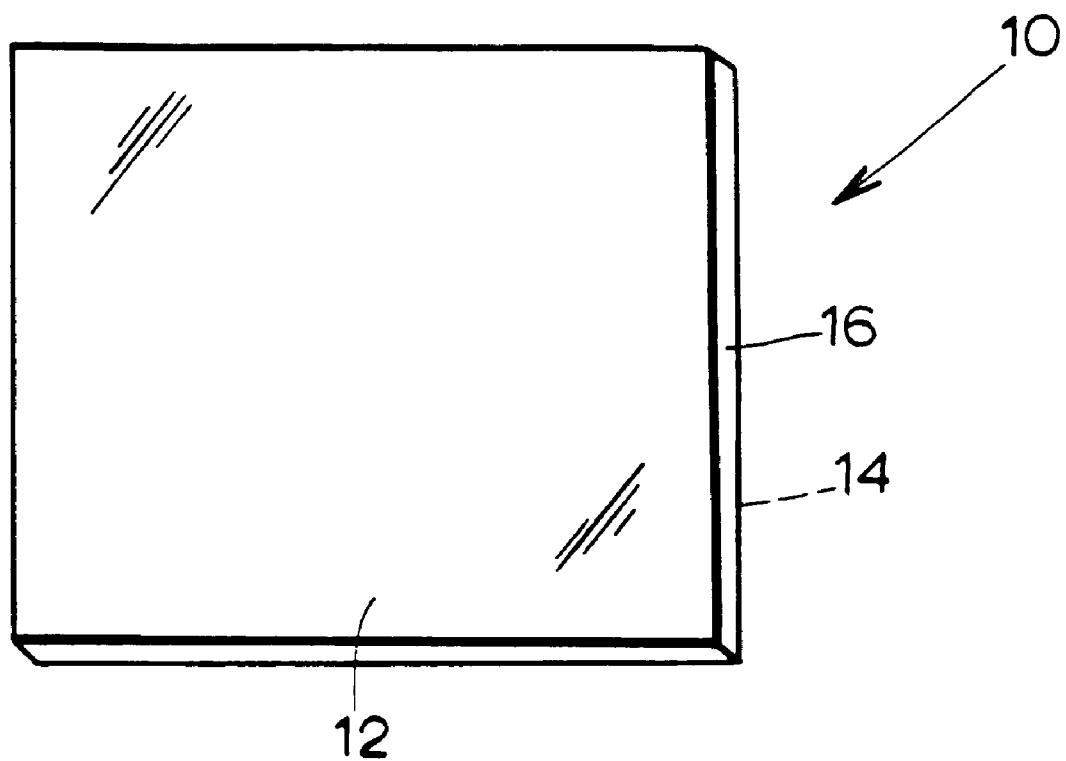
FIG. 1 illustrates a rain erosion resistant, CVD ZnS window m ade according to the invention.

FIG. 1 illustrates a gallium-doped CVD ZnS window 10 made by the inventive method. The window 10 is shown having a first surface 12 parallel to a second surface 14 and having a thickness 16. The gallium-doped CVD ZnS windows made by the inventive method, however, are not limited to the embodiment shown in FIG. 1 as various other sizes, shapes, and configurations are possible.

Figure 2:
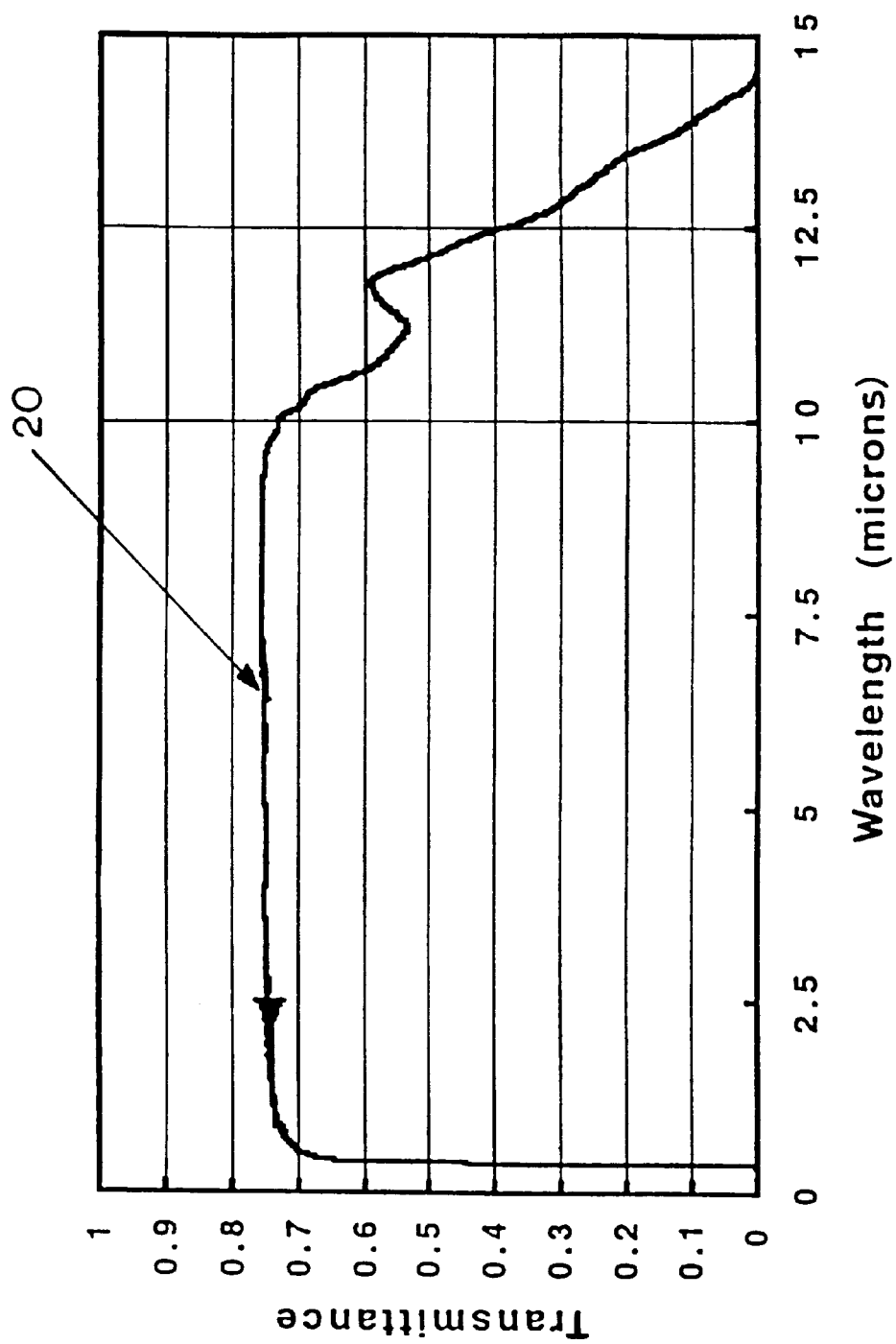
FIG. 2 illustrates on coordinates of transmission and wavelength, a plot of a transmission curve of a non-treated hot isostatic pressed CVD ZnS window.
Figure 3:
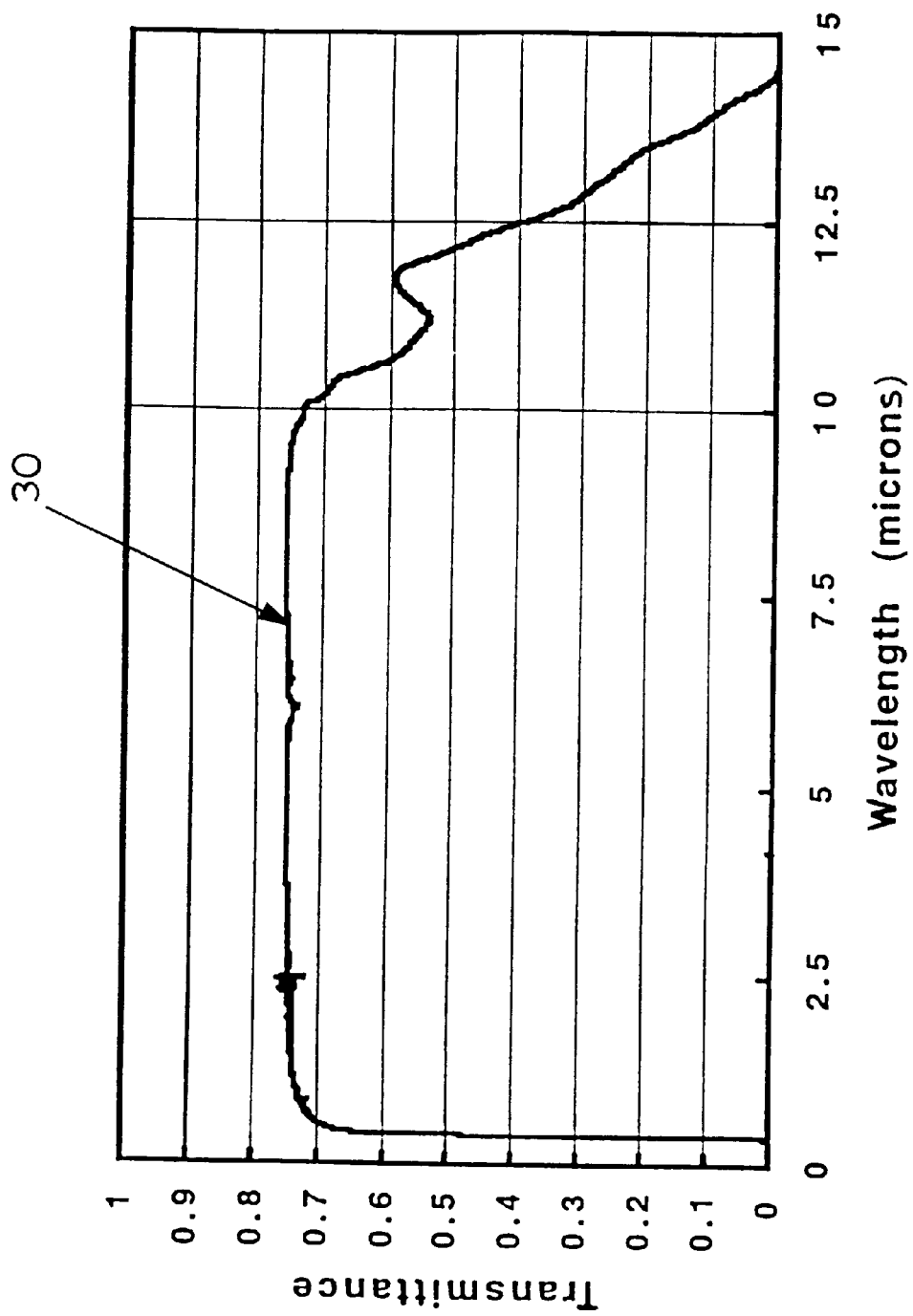
FIG. 3 illustrates on coordinates of transmission and wavelength (from 200 to 2450 nanometers), a plot of a transmissio n curve of a treated hot isostatic pressed CVD ZnS window according to the invention, the window not having undergone a rain erosion test.

FIG. 2 illustrates a transmission curve 20 for a circular-shaped, hot isostatic pressed CVD ZnS window having a thickness of about 0.375 inches (0.95 centimeters) and a diameter of about one inch (2.54 centimeters), the window not having undergone the aforementioned gallium doping treatment. In contrast, FIG. 3 illustrates a transmission curve 30 for a hot isostatic pressed CVD ZnS window having identical dimensions, the window having undergone the aforementioned gallium doping treatment. Specifically, the window was immersed in a liquid gallium bath having a temperature of 815° C. for about 60 hours. A comparison of FIGS. 2 and 3 reveals that no noticeable degradation in optical transmission occurs in the wavelength range of about 0.33 micrometers (330 nanometers) to about 14 micrometers (14,000 nanometers) when the hot isostatic pressed CVD ZnS window is doped with gallium according to the inventive method. Both, treated and untreated, windows (neither of which has an anti-reflective coating) have excellent transmission coefficients (about 75%) in the ultraviolet to infrared spectrum.

The amount of gallium diffused into a CVD ZnS or hot isostatic pressed CVD ZnS body preferably is at least about one mole percent (mol. %) based on the total moles of the body, and more preferably is about one mol. % to about two mol. %, and depends upon the temperature-dependent diffusion rate of gallium, the temperature of the gallium solution, and the amount of time that the body is exposed to the gallium. It is believed that the higher the concentration of gallium in the CVD ZnS body, the more resistant the body is to rain erosion. The concentration of gallium in the body increases with prolonged exposure at high temperatures to the liquid gallium. Preferably, the temperature of the liquid gallium solution is about 600° C. to about 1000° C., more preferably about 700° C. to about 980° C., and most preferably about 750° C. to about 950° C. The amount of time that the body is immersed in the liquid gallium is at least about 30 minutes, preferably about one hour to about four weeks (672 hours), more preferably about one hour to about 80 hours, and most preferably about two hours to about 40 hours. The maximum immersion time, however, may greatly exceed 672 hours in certain applications depending upon the desired end use of the formed product.

Preferably, a pure or nearly pure liquid gallium material such as gallium ingots, which are commercially available under the name Alfa AESAR from Johnson Matthey Co., Ward Hill, Mass., is used. The gallium is typically 99.99% pure, however, the liquid gallium may contain trace amounts of various impurities, such as, for example, about 0.00012 percent by weight (wt. %) of indium based on the total weight of the liquid, and about 0.0003 wt. % of copper based on the total weight of the liquid. It is noted, however, that liquid gallium materials having lower purity levels may be used according to the invention. Gallium has a melting point of about 29° C. and, therefore, remains in a solid state at room temperatures and in a liquid state at temperatures slightly above room temperature.

The gallium imparts a hardness and structural integrity to the gallium-doped zinc sulfide body superior to that of the non-doped zinc sulfide body. In particular, a Vickers micro-indentation hardness test indicates that a gallium-doped zinc sulfide body according to the invention exhibits about a 38% improvement over the observed Vickers hardness of the non-doped material. A Vickers micro-indentation hardness test is an indentation hardness test using a 136° diamond pyramid indenter (Vickers) and variable loads enabling the use of one hardness scale for all ranges of hardness, and is more fully described in, for example, ASTM Designation No. E384–89, "Standard Test Method for Microhardness of Materials," ANNUAL BOOK OF ASTM STANDARDS, vol. 03.01, pgs. 466–471 (1990). An optional annealing step performed after doping the zinc sulfide body with gallium may enhance the hardness and structural integrity of the doped body even further. It is believed that by annealing the gallium-doped, CVD ZnS body (or a gallium-doped, hot isostatic pressed CVD ZnS body) a hardness-enhancing zinc thiogallate ($ZnGa_2S_4$) phase will form throughout the body. When the $ZnGa_2S_4$ phase is grown in the optimum crystal size of about 50 nanometers, the hardness is further improved beyond that obtainable through mere doping with gallium, without degrading the IR transmission capability.

EXAMPLE 1

This example illustrates the inventive method and evaluates the relative improvements in strength and structural integrity by comparing the Vickers hardness of a gallium-doped, hot isostatic pressed CVD ZnS window with that of a non-doped, hot isostatic pressed CVD ZnS window.

A rectangular-shaped piece of hot isostatic pressed CVD ZnS window having approximate dimensions of 0.1 inches (0.25 centimeters) by 0.5 inches (1.27 centimeters) by 0.2 inches (0.5 centimeters) was placed in a quartz tube containing liquid gallium (99.99% pure gallium). The tube was evacuated, sealed, and placed in a resistance heated box furnace. The tube was heated to provide a liquid gallium temperature of about 840° C. and to maintain a liquid gallium temperature of about 840° C. for about 40 hours. During this heating step, gallium diffused into the piece of hot isostatic pressed CVD ZnS window to form a gallium-doped, hot isostatic pressed CVD ZnS window. The gallium-doped, hot isostatic pressed CVD ZnS window was lightly polished to a desired finish.

Each window was subjected to a Vickers hardness test, ASTM designation No. E384–89. The gallium-doped, hot isostatic pressed CVD ZnS window had a Vickers hardness of 229, while a non-doped, hot isostatic pressed CVD ZnS window had a Vickers hardness of 166.

EXAMPLE 2

This example illustrates the inventive method and evaluates the relative improvements in rain erosion durability by comparing the rain erosion durability of a gallium-doped, hot isostatic pressed CVD ZnS window with that of a non-doped, hot isostatic pressed CVD ZnS window.

Standard size (1 inch diameter and 0.375 inch thick) pieces of gallium-doped, hot isostatic pressed CVD ZnS window and non-doped, hot isostatic pressed CVD ZnS window were exposed to rain for twenty minutes, the rain hitting the gallium-doped and non-doped, hot isostatic pressed CVD ZnS windows, at 470 miles per hour at an angle of incidence of about 90° for about twenty minutes. The treated window was gallium-doped by immersing the hot isostatic pressed CVD ZnS window in a liquid gallium bath having a temperature of about 815° C. for about 60 hours.

Figure 4:
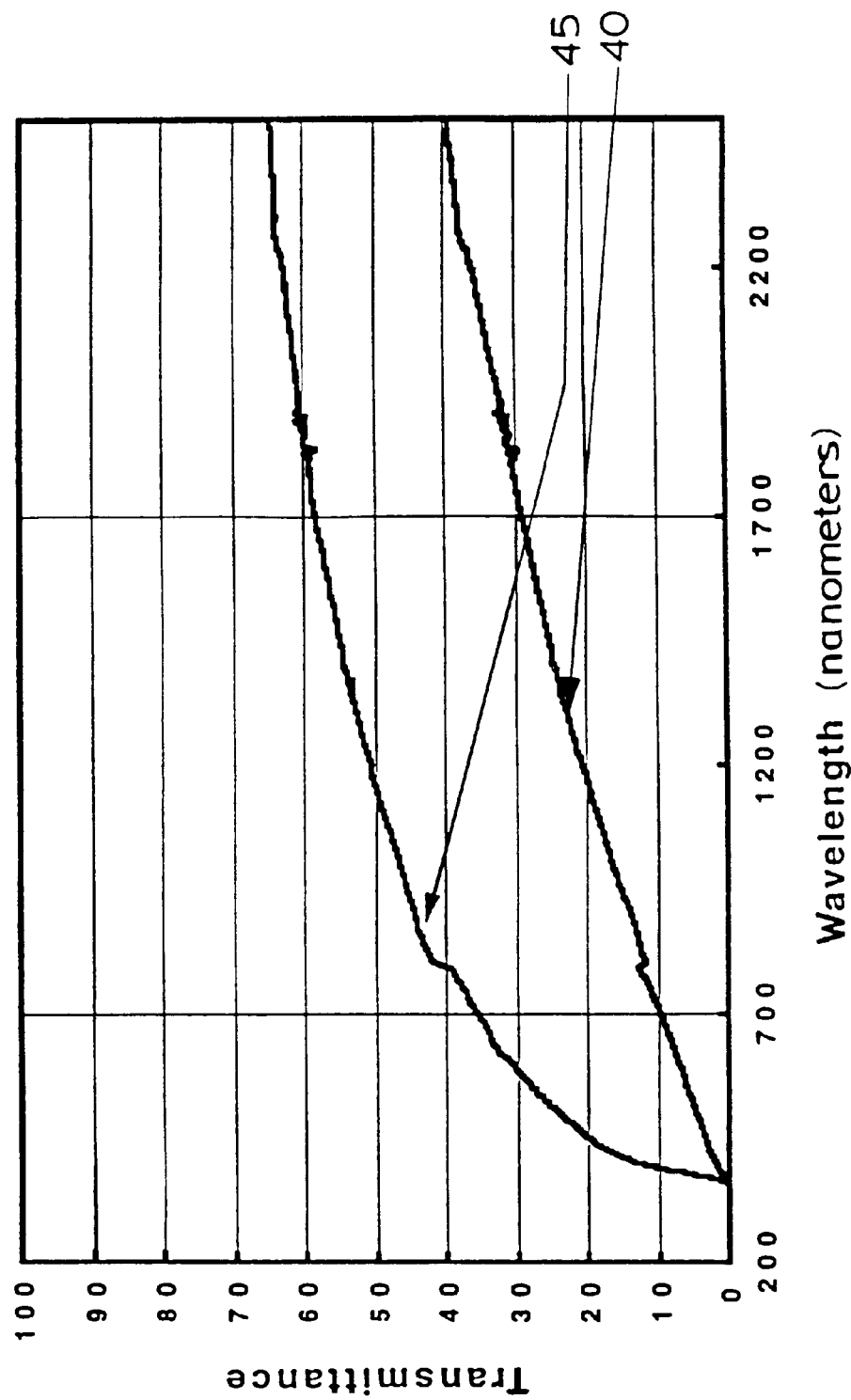
FIG. 4 illustrates on coordinates of transmission and wavelength (from 2 to 16 microns), plots of transmission curves of a non-treated hot isostatic pressed CVD ZnS window and a treated hot isostatic pressed CVD ZnS window according to the invention, each of said windows having undergone a rain erosion test.

FIG. 4 illustrates post-rain erosion test transmission curves 40 and 45 for the non-doped, hot isostatic pressed CVD ZnS window and gallium-doped, hot isostatic pressed CVD ZnS window, respectively, between a wavelength range of about 200 nanometers to about 2450 nanometers. It can be seen from the transmission curves 40 and 45 that the gallium-doped, hot isostatic pressed CVD ZnS window has a higher transmission efficiency than does the non-doped, hot isostatic pressed CVD ZnS window in the wavelength range of about 200 nanometers to about 2450 nanometers. Furthermore, FIG. 4 illustrates that the gallium-doped, hot isostatic pressed CVD ZnS window exhibited about a 100% higher transmission than the non-doped, hot isostatic pressed CVD ZnS window in the visible light range (e.g., about 380 nanometers to about 700 nanometers).

Figure 5:
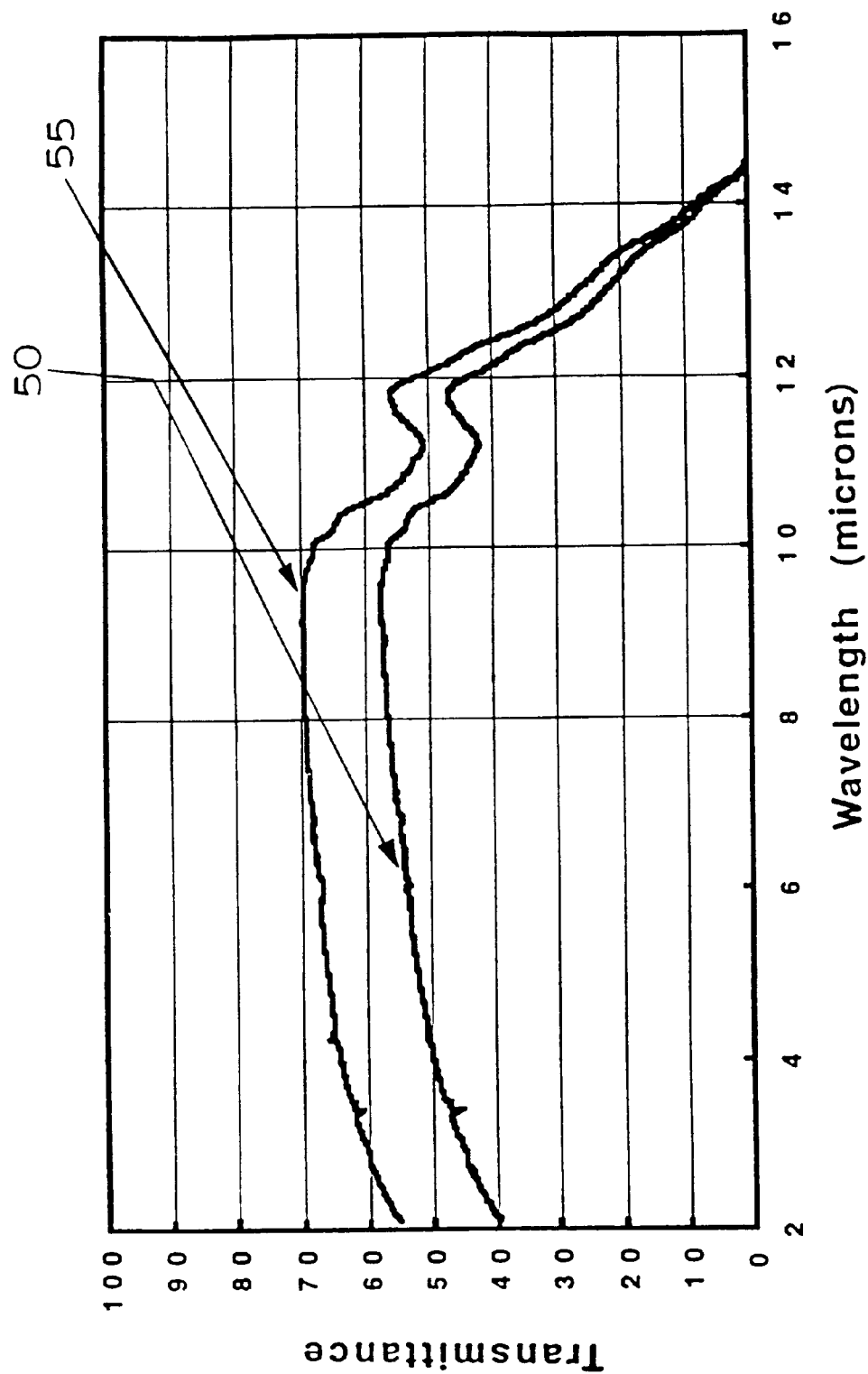
FIG. 5 illustrates on coordinates of transmission and wavelength, plots of transmission curves of a non-treated hot isostatic pressed CVD ZnS window and a treated hot isostatic pressed CVD ZnS window according to the invention, each of said windows having undergone a rain erosion test.

FIG. 5 illustrates post-rain erosion test transmission curves 50 and 55 for the non-doped, hot isostatic pressed CVD ZnS window and gallium-doped, hot isostatic pressed CVD ZnS window, respectively, between a wavelength range of about 2 micrometers (2000 nanometers) to about 16 micrometers (16,000 nanometers). Transmission curves 50 and 55 indicate that the gallium-doped, hot isostatic pressed CVD ZnS window has a higher transmission efficiency than does the non-doped, hot isostatic pressed CVD ZnS window. A comparison of the transmission curves 30 (FIG. 3) and 55 (FIG. 5) reveals that the gallium-doped, hot isostatic pressed CVD ZnS window lost only about 2% to about 5% of its intrinsic transmission between the wavelength range of about 8 micrometers (8000 nanometers) to about 10 micrometers (10,000 nanometers). In contrast, a comparison of the transmission curves 20 (FIG. 2) and 50 (FIG. 5) reveals that the non-doped, hot isostatic pressed CVD ZnS window lost at least about 15% of its intrinsic transmission between the same wavelength range.

A gallium-doped, CVD ZnS window (or a gallium-doped, hot isostatic pressed, CVD ZnS window) according to the invention has an improved strength and hardness over the non-doped windows, exhibits improved durability and resistance to rain erosion, superior light transmission characteristics, and may be used in combination with conventional coatings. A gallium-doped CVD ZnS window or a gallium-doped, hot isostatic pressed, CVD ZnS window made according to the inventive method is capable of transmitting with at least about 150% more efficiency than a non-doped window, in the visible spectrum of light having a wavelength in the range of about 380 nanometers to about 700 nanometers. Furthermore, a gallium-doped CVD ZnS window or a gallium-doped, hot isostatic pressed, CVD ZnS window made according to the inventive method is capable of transmitting with at least about 100% more efficiency than a non-doped window, light having a wavelength in the range of about 700 nanometers to about 2000 nanometers. Still further, a gallium-doped CVD ZnS window or a gallium-doped, hot isostatic pressed, CVD ZnS window made according to the inventive method also is capable of transmitting with at least about 40% more efficiency than a non-doped CVD ZnS window, light having a wavelength in the range of about 2000 nanometers to about 12,000 nanometers.

The foregoing description is given for clearness of understanding only, and no unnecessary limitations should be understood therefrom, as modifications within the scope of the invention may be apparent to those having ordinary skill in the art.

What is claimed is:

1. A method of treating a body of zinc sulfide formed by chemical vapor deposition to increase the rain erosion durability of said body, the method comprising the step of immersing said body in a liquid solution comprising gallium having a solution temperature of about 600° C. to about 1000° C. for a time period of at least about 30 minutes.

2. The method of claim 1, wherein said body is hot isostatic pressed prior to immersion in said liquid solution.

3. The method of claim 1, wherein said body is optically transmissive.

4. The method of claim 3, wherein said body is a window capable of transmitting light having a wavelength of about 300 nanometers to about 15,000 nanometers.

5. The method of claim 4, wherein said body is a window capable of transmitting light having a wavelength of about 380 nanometers to about 700 nanometers.

6. The method of claim 1, wherein the temperature is about 700° C. to about 980° C. and said time period is about one hour to about 672 hours.

7. The method of claim 6, wherein the time period is about one hour to about 80 hours.

8. The method of claim 7, wherein the temperature is about 750° C. to about 950° C. and said time period is about two hours to about 40 hours.

9. The method of claim 1, wherein said gallium is in the form of gallium metal ions.

10. The method of claim 1 optionally comprising the step of annealing said zinc sulfide body after said immersion step to form a hardness-enhancing zinc thiogallate phase.

* * * * *